(12) United States Patent
Rojon et al.

(10) Patent No.: US 12,291,816 B2
(45) Date of Patent: May 6, 2025

(54) NON-COMBUSTIBLE, BREATHABLE MEMBRANE

(71) Applicant: Serge Ferrari SAS, Saint Jean de Soudain (FR)

(72) Inventors: Jonathan Rojon, Glattfelden (CH); Guilhem Merenna, Zurich (CH); Julia Breton, Zurich (CH)

(73) Assignee: Serge Ferrari SAS, Saint Jean de Soudain (FR)

( * ) Notice: Subject to any disclaimer, the term of this patent is extended or adjusted under 35 U.S.C. 154(b) by 739 days.

(21) Appl. No.: 17/261,416

(22) PCT Filed: Jul. 15, 2019

(86) PCT No.: PCT/FR2019/051771
§ 371 (c)(1),
(2) Date: Jan. 19, 2021

(87) PCT Pub. No.: WO2020/021181
PCT Pub. Date: Jan. 30, 2020

(65) Prior Publication Data
US 2021/0300820 A1 Sep. 30, 2021

(30) Foreign Application Priority Data
Jul. 25, 2018 (FR) ...................................... 1856923

(51) Int. Cl.
*D06N 3/00* (2006.01)
*B32B 5/02* (2006.01)
(Continued)

(52) U.S. Cl.
CPC .............. *D06N 3/128* (2013.01); *B32B 5/02* (2013.01); *B32B 17/02* (2013.01); *B32B 17/04* (2013.01);
(Continued)

(58) Field of Classification Search
None
See application file for complete search history.

(56) References Cited

U.S. PATENT DOCUMENTS 4,286,013 A * 8/1981 Daroga ...................... C08J 9/32
442/178
4,340,090 A * 7/1982 Matsushita ............. C03C 25/40
138/123
(Continued)

FOREIGN PATENT DOCUMENTS

CN 101130663 A * 2/2008
CN 101633818 A * 1/2010
(Continued)

OTHER PUBLICATIONS

Machine Translation of DE-202004005399-U1, Sep. 2004 (Year: 2004).*
(Continued)

*Primary Examiner* — Jeffrey A Vonch
(74) *Attorney, Agent, or Firm* — MARSHALL, GERSTEIN & BORUN LLP

(57) ABSTRACT

A coated textile contains a web based on glass fibres having a back face, a front face and at least one edge. The front face is covered with a coating layer based on silicone and back face is capable of being bonded to a support. The coating layer has a thickness between 5 μm and 250 μm and includes at least one inorganic flame retardant compound in a quantity which is sufficient for the coated textile to have a gross calorific value of less than or equal to 3 MJ/kg, the inorganic flame retardant compound having a D50 granule size of less than 50 μm.

19 Claims, 1 Drawing Sheet

(51) Int. Cl.
  *B32B 17/02* (2006.01)
  *B32B 17/04* (2006.01)
  *B32B 27/20* (2006.01)
  *B32B 27/28* (2006.01)
  *C03C 25/1095* (2018.01)
  *C03C 25/47* (2018.01)
  *C09D 183/04* (2006.01)
  *D06N 3/12* (2006.01)
  *E04B 1/62* (2006.01)
  *E04B 1/94* (2006.01)
  *B32B 7/12* (2006.01)
  *C08K 3/22* (2006.01)
  *C09D 5/18* (2006.01)
  *E04F 13/00* (2006.01)

(52) U.S. Cl.
  CPC ............ *B32B 27/20* (2013.01); *B32B 27/283* (2013.01); *C03C 25/1095* (2013.01); *C03C 25/47* (2018.01); *C09D 183/04* (2013.01); *D06N 3/0022* (2013.01); *D06N 3/0063* (2013.01); *E04B 1/625* (2013.01); *E04B 1/941* (2013.01); *B32B 5/022* (2013.01); *B32B 5/024* (2013.01); *B32B 7/12* (2013.01); *B32B 2255/02* (2013.01); *B32B 2255/26* (2013.01); *B32B 2262/101* (2013.01); *B32B 2264/10* (2013.01); *B32B 2264/1052* (2020.08); *B32B 2307/3065* (2013.01); *B32B 2307/54* (2013.01); *B32B 2307/71* (2013.01); *B32B 2307/712* (2013.01); *B32B 2307/718* (2013.01); *B32B 2307/724* (2013.01); *B32B 2307/7265* (2013.01); *B32B 2383/00* (2013.01); *B32B 2419/00* (2013.01); *C08K 3/22* (2013.01); *C08K 2003/2227* (2013.01); *C09D 5/18* (2013.01); *D06N 3/0006* (2013.01); *D06N 3/0011* (2013.01); *D06N 2201/085* (2013.01); *D06N 2203/066* (2013.01); *D06N 2209/067* (2013.01); *D06N 2209/10* (2013.01); *D06N 2209/123* (2013.01); *D06N 2209/128* (2013.01); *D06N 2209/1678* (2013.01); *D06N 2209/1692* (2013.01); *D06N 2211/06* (2013.01); *D06N 2211/063* (2013.01); *D10B 2101/06* (2013.01); *D10B 2503/04* (2013.01); *E04F 13/002* (2013.01); *E04F 2290/045* (2013.01); *Y10S 428/921* (2013.01); *Y10T 428/27* (2015.01); *Y10T 428/273* (2015.01); *Y10T 428/2982* (2015.01); *Y10T 442/2139* (2015.04); *Y10T 442/223* (2015.04); *Y10T 442/2369* (2015.04); *Y10T 442/2377* (2015.04); *Y10T 442/2393* (2015.04); *Y10T 442/2631* (2015.04); *Y10T 442/2992* (2015.04)

(56) References Cited

U.S. PATENT DOCUMENTS

| | | | | |
|---|---|---|---|---|
| 4,526,830 A * | 7/1985 | Ferziger | D06M 11/47 | 428/920 |
| 4,600,634 A * | 7/1986 | Langer | H01B 7/295 | 428/920 |
| 4,618,522 A * | 10/1986 | Modic | D06N 3/128 | 428/141 |
| 4,666,765 A * | 5/1987 | Caldwell | D06N 3/128 | 428/447 |
| 4,994,317 A | 2/1991 | Dugan et al. | | |
| 5,091,243 A * | 2/1992 | Tolbert | A47C 31/001 | 428/920 |
| 5,401,566 A * | 3/1995 | Magee | D06M 15/643 | 428/36.1 |
| 5,607,758 A * | 3/1997 | Schwartz | D06N 3/128 | 428/920 |
| 5,786,285 A * | 7/1998 | Walla | B29C 70/467 | 442/397 |
| 5,912,195 A * | 6/1999 | Walla | B29C 70/467 | 428/408 |
| 5,998,536 A * | 12/1999 | Bertry | C08J 3/03 | 524/588 |
| 6,140,414 A * | 10/2000 | Ohsawa | D06M 11/78 | 428/36.1 |
| 6,200,915 B1 * | 3/2001 | Adams | D06N 3/128 | 428/36.1 |
| 6,354,620 B1 * | 3/2002 | Budden | C09D 183/04 | 442/99 |
| 6,511,754 B1 * | 1/2003 | Bohin | C08K 9/06 | 524/588 |
| 6,623,864 B1 * | 9/2003 | Sweet | C08K 7/24 | 524/588 |
| 6,670,291 B1 * | 12/2003 | Tompkins | B32B 27/12 | 428/920 |
| 2003/0054717 A1 * | 3/2003 | Ahluwalia | A47C 31/001 | 428/920 |
| 2004/0059034 A1 * | 3/2004 | Desne | C08K 3/34 | 524/413 |
| 2004/0242768 A1 * | 12/2004 | Butts | D06M 13/207 | 428/452 |
| 2006/0099346 A1 * | 5/2006 | Martin | C03C 25/1095 | 427/372.2 |
| 2006/0115656 A1 * | 6/2006 | Martin | D06N 3/128 | 428/297.4 |
| 2006/0122323 A1 * | 6/2006 | Dumont | D06N 3/128 | 524/588 |
| 2006/0202176 A1 * | 9/2006 | Koyama | D06M 11/76 | 252/608 |
| 2007/0026244 A1 * | 2/2007 | Budden | D06M 15/356 | 524/588 |
| 2007/0054137 A1 * | 3/2007 | Mueller | C08L 83/04 | 428/447 |
| 2008/0020190 A1 | 1/2008 | Nun et al. | | |
| 2008/0207827 A1 * | 8/2008 | Dumont | C08L 83/04 | 524/588 |
| 2009/0221203 A1 * | 9/2009 | Nosker | C09D 5/18 | 524/588 |
| 2009/0246499 A1 * | 10/2009 | Katsoulis | C09D 183/04 | 156/278 |
| 2009/0298367 A1 * | 12/2009 | Lafaysse | C09D 183/04 | 428/323 |
| 2010/0255270 A1 * | 10/2010 | Stuebiger | D06M 15/564 | 442/139 |
| 2010/0319850 A1 * | 12/2010 | Panse | D06M 23/14 | 427/288 |
| 2011/0308181 A1 | 12/2011 | Freeman | | |
| 2012/0052758 A1 * | 3/2012 | Peschko | C09D 183/04 | 524/588 |
| 2013/0196136 A1 * | 8/2013 | Contzen | B32B 27/12 | 428/221 |
| 2013/0210303 A1 * | 8/2013 | Doi | B32B 27/18 | 428/688 |
| 2013/0323497 A1 * | 12/2013 | Ullrich | E04B 1/941 | 428/221 |
| 2014/0301090 A1 * | 10/2014 | Doi | F21V 25/12 | 428/447 |
| 2015/0376366 A1 * | 12/2015 | Hirano | C09D 5/18 | 524/379 |
| 2016/0097155 A1 * | 4/2016 | Fan | D06N 3/0006 | 442/88 |
| 2016/0208434 A1 * | 7/2016 | Hamdani-Devarennes | | C03C 25/47 |
| 2016/0325705 A1 * | 11/2016 | Zhou | B32B 5/02 | |
| 2020/0070764 A1 * | 3/2020 | Ashida | C09D 183/04 | |

FOREIGN PATENT DOCUMENTS

| | | | |
|---|---|---|---|
| CN | 102851949 A | * | 1/2013 |
| CN | 103469423 A | * | 12/2013 |
| CN | 103623520 A | * | 3/2014 |

(56) References Cited

FOREIGN PATENT DOCUMENTS

| DE | 202004005399 U1 | * | 9/2004 | ............ B32B 27/12 |
|---|---|---|---|---|
| FR | 2919630 A1 | * | 2/2009 | ............ B60D 5/00 |
| JP | 2000084106 A | * | 3/2000 | |
| JP | 2001079104 A | * | 3/2001 | |
| JP | 2002235284 A | * | 8/2002 | |
| JP | 2005194639 A | * | 7/2005 | |
| JP | 2006145910 A | * | 6/2006 | |
| JP | 2010053493 A | * | 3/2010 | |
| JP | 2010196247 A | * | 9/2010 | |
| JP | 2013245414 A | * | 12/2013 | |
| JP | 2016121417 A | * | 7/2016 | |
| KR | 1517854 B1 | * | 5/2015 | ............... D01F 1/07 |
| KR | 2017078364 A | * | 7/2017 | ............ B32B 27/12 |

OTHER PUBLICATIONS

Machine Translation of JP-2010053493-A, Mar. 2010 (Year: 2010).*
International Search Report issued in PCT Patent Application No. PCT/FR2019/051771 mailed Nov. 15, 2019.
Wypych G Ed—Wypych G. Handbook of Fillers, Handbook of Fillers, Chemtec Publishing, Toronto, Ontario, Canada, pp. 246, I-IIED.2 (Jan. 1999).

* cited by examiner

NON-COMBUSTIBLE, BREATHABLE MEMBRANE

FIELD OF THE INVENTION

The present invention relates to the field of waterproof breathable membranes, in particular for covering the façades of buildings.

More precisely, the present invention concerns membranes based on glass fibres having excellent fire resistance and an impermeability/waterproofing and breathability which is suitable for use as a covering for a façade of a building.

BACKGROUND

Membranes intended to be applied to a façade of a building have to be impervious to liquid water, while guaranteeing a certain breathability. They also have to have sufficient resistance to ultraviolet radiation (UV) and to temperature because they are directly exposed to sunlight and to bad weather such as rain. The membranes which are available on the market are composed of a textile support coated with a covering which can be used to combine these properties of impermeability and breathability. In particular, liquid water cannot pass through the membrane, while water vapour can pass through. This property guarantees that the interior of the building is protected from water by preventing it from penetrating but by allowing vapour to escape, which in particular avoids the phenomena of condensation of water inside the building.

Currently, waterproof breathable membranes used to cover the façades of buildings mainly comprise a support in the form of a web produced from a nonwoven. In general, this web is based on fibres of polyester, polypropylene, glass or in fact a mixture of glass fibres and polyester fibres. Sometimes, membranes which are currently available on the market also include a woven armature.

However, glass fibres are used very little in this application. In fact, nonwovens based on glass fibres have a crease fold strength which is frequently too low and textiles from glass are more expensive than textiles based on polyester or polypropylene. Furthermore, the person skilled in the art is not encouraged to incorporate glass fibres into a waterproof breathable membrane intended to be applied to a façade of a building because of the risk of breaking if the fibres are folded and the low resistance they have to hydrolytic ageing.

In general, coverings are based on polyurethane (PU), polyamide or acrylic. Coverings based on polyvinyl chloride (PVC) foam are also known, but these are used solely as a roofing underlay because they have neither sufficient breathability nor sufficient UV resistance at the temperature for use on a façade of a building.

Examples of coverings based on acrylic that can be cited are acrylic dispersions, homopolymers or copolymers, known for their UV stability. In order to obtain sufficient breathability, these dispersions are generally mechanically "foamed".

These coverings may be made fire resistant by adding inorganic flame retardant compounds such as aluminium trihydrate, magnesium hydroxide, silicas, zeolites, zinc hydroxystannate, calcium hydroxystannate, antimony trioxide ($Sb_2O_3$), calcium carbonate ($CaCO_3$) as well as inorganic pigments and metallic fillers, such as aluminium or copper in particular. However, the presence of these compounds reduces the impermeability to water.

PU-based coverings are generally in a form which can be extruded when molten or in the form of an aqueous dispersion. These PU-based coverings have the advantage of being flexible at low temperatures. In contrast, it is difficult to make them resistant to UV and to make them flame retardant when they are in a melt-extrudable form. Furthermore, PU-based coverings have poor intrinsic impermeability properties and do not age well at high temperatures (loss of flexibility—brittleness), which further degrades the impermeability. Patent application US 2011/308181 discloses a textile which is permeable to vapour and impermeable to liquids, which is intended to be positioned on an exterior façade of a house comprising a polyurethane-based covering.

In general, these membranes have a gross calorific value (GCV) above 20 MJ/kg, and typically of the order of 25 MJ/kg. Following a tragic fire in a high-rise building in England, legislation is being modified, in particular in Europe and in Switzerland, in particular for buildings which are over 11 m high. Requirements in terms of fire resistance will soon be stepped up. In particular, the GCV required for membranes will have to be less than 4 MJ/kg in Switzerland and less than 3 MJ/kg in Germany.

As an alternative, U.S. Pat. No. 4,994,317 proposes a textile which acts as a barrier to fire, having a layer of silicone and an aluminium-based flame retardant. However, the GCV obtained is too high to comply with these requirements.

Thus, there is a need for the development of membranes intended to be applied to a façade of a building, having a GCV which complies with future legislation.

SUMMARY OF THE DISCLOSURE

In order to satisfy this need, the Applicant has developed a membrane based on glass fibres, coated on one face with a covering based on silicone containing an inorganic flame retardant compound.

Thus, the disclosure concerns a coated textile containing a web based on glass fibres having a back face, a front face and at least one edge, said front face being covered with a coating layer based on silicone and said back face being capable of being bonded to a support, said coating layer having a thickness between 5 µm and 250 µm and comprising at least one inorganic flame retardant compound in a quantity which is sufficient for the coated textile to have a gross calorific value of less than or equal to 3 MJ/kg, the inorganic flame retardant compound having a D50 granule size of less than 50 µm.

The term "edge" means the surface substantially perpendicular to the front and back faces of the web, forming the contour thereof. Advantageously, the edge of the web of glass fibres is covered with the coating layer, in a manner such as to protect this textile web from outdoor humidity.

The term "capable of being bonded to a support" means the ability to be attached to another material by the addition of an intermediate material.

In practice, the back face may, for example, have a surface which can be primed with and adhesive with a view to attaching it to a wall, or a layer or sheet of construction or insulation material.

The disclosure also concerns a process for the production of the textile described above, comprising at least the following steps:

obtaining a woven or nonwoven web based on glass fibres, coating said front face with a silicone-based composition comprising between 5% and 70% by weight of at least one inorganic flame retardant compound.

The disclosure also concerns the use of the textile described above as a covering for a structure of a building.

In other words, the Applicant has developed a membrane comprising a web based on glass fibres covered with a layer of silicone coating, which is resistant to fire and which surprisingly combines results which are satisfactory in terms of impermeability to water, breathability, and limited GCV. In fact, a compromise can be found between apparently contradictory properties, because the more the impermeability to water increases, the more the fire resistance properties and breathability properties are degraded. The disclosed embodiments also have unexpected advantages in complementary aspects, namely stability to temperature and to UV, as well as crease fold strength.

The advantages of the membrane are a high temperature stability, excellent UV stability, and impermeability to rain while having good waterproofing and breathability properties and still be a non-combustible material.

The textile comprises a web based on glass fibres. The web may be woven or nonwoven, or in fact in the form of a screen, and said front face and preferably said edge are covered with a coating layer based on silicone comprising at least one inorganic flame retardant compound. The web may also comprise steel cables.

The thickness and the weight of said web and of said coating layer have an influence on the mechanical strength and flexibility of the coated textile. Furthermore, the thickness and the weight of said coating layer have an influence on the impermeability and waterproofing and breathability properties of the coated textile. The GCV also increases with the weight of the coating layer. Thus, it is preferable to find a compromise between mechanical strength, flexibility, impermeability, waterproofing and breathability properties and GCV. In particular, the thickness of said coating layer has to be sufficient to guarantee impermeability, but limited in order to allow it to have sufficient waterproofing and breathability properties.

Thus, the web advantageously has a thickness between 20 μm and 1 mm, more advantageously between 50 μm to 500 μm, yet more advantageously between 100 μm and 300 μm.

Advantageously, the web has a weight between 20 g/m$^2$ and 1000 g/m$^2$, more advantageously between 50 g/m$^2$ and 500 g/m$^2$, and yet more advantageously between 100 g/m$^2$ and 300 g/m$^2$.

Thus, advantageously, the silicon-based coating layer has a weight between 10 and 300 g/m$^2$.

Thus, advantageously, the silicon-based coating layer has a thickness between 5 and 250 μm on said front face, more advantageously between 25 and 150 μm and yet more advantageously between 50 and 100 μm.

The coating layer may be based on a variety of types of silicone. Advantageously, the coating layer is based on silicone selected from the group generally comprising polysiloxanes and their copolymers, and in particular polydimethylsiloxanes, polydiphenylsiloxanes, oligosiloxanes, polyaminosiloxanes, or polyvinylsiloxanes.

The silicon-based coating layer ensures the impermeability both of the front face and of the edge, if appropriate, in order to prevent the penetration of water and to limit the risk of the web going mouldy.

In certain cases, the back face of the web based on glass fibres is also covered with a coating layer, in a manner such as to protect this back face, and in particular the peaks of the woven fibrous web, from abrasion.

In this case, advantageously and in practice, the coating layers covering the front and back faces are based on the same material, and having regard to the overall weight, it may be preferable for the thickness of the coating layer covering the back face to be less than the thickness of the coating layer covering the front face.

The flame retardant property is provided by an inorganic flame retardant compound which is incorporated into the coating layer. The effectiveness of a flame retardant compound depends on its environment, its nature and its quantity.

Thus, advantageously, said inorganic flame retardant compound is selected from the group comprising aluminium trihydrate, magnesium hydroxide, silicas, zeolites, zinc hydroxystannate, calcium hydroxystannate, antimony trioxide ($Sb_2O_3$), calcium carbonate ($CaCO_3$), as well as inorganic pigments and metallic fillers such as aluminium or copper in particular.

The quantity of inorganic flame retardant compound is sufficient for the coated textile to have a gross calorific value of less than or equal to 3 MJ/kg.

The GCV is measured in accordance with the standard EN ISO 1716 using the "bomb calorimeter" method.

In certain cases, the size of the granules of inorganic flame retardant compound may have an influence on the impermeability of the textile. In fact, if the granule size is too large, these granules might not become embedded in the material of the silicon-based coating layer and, in contrast, may rise to the surface. This phenomenon might generate weaknesses in the coating layer and reduce the impermeability of the textile.

Thus, the inorganic flame retardant compound has a granule size D50 of less than 50 μm, advantageously less than 20 μm.

Advantageously, said coating layer comprises between 5% and 70% by weight of at least one inorganic flame retardant compound, more advantageously between 15% and 65%, and yet more advantageously between 35% and 60%.

The person skilled in the art is capable of determining the GCV of a textile. Thus, the person skilled in the art can readily adapt the quantity of flame retardant compound to be incorporated into said coating layer as a function of the nature of the selected inorganic flame retardant compound. The GCV is expressed in MJ/kg, and can be calculated by producing the weighted mean of the GCVs of the elements constituting a composite.

By way of example, for a 250 g/m$^2$ glass fibre fabric coated with a 135 g/m$^2$ silicone containing 9% of inorganic fillers, the calculation breaks down as follows:

GCV glass: 0 MJ/kg
GCV silicone: 20 MJ/kg
GCV inorganic fillers: 0 MJ/kg
GCV of composite=(250*0+135*0.91*20+135*0.09*0)/(250+135)=6.4 MJ/kg The back face is capable of being bonded to a support. The nature of the support may vary widely, and in particular is a metal such as aluminium for metal frameworks, and/or of wood. The back face is generally bonded to a structure having apertured zones, the impermeability preventing the passage of liquid, in particular water, while the waterproofing and breathability property allows gas, in particular water vapour, to escape from its apertured zones. The support may also be a layer of construction or insulation material such as rockwool or glass wool.

In order to produce textiles with large dimensions, it is possible to assemble panels of textile parallel to each other.

In this case, the front face of the selvedge of a first panel is capable of being bonded to the selvedge of the back face of a second panel in order to form overlapping joints.

In order to bond the face covered with the coating layer, it is possible, for example, to use conventional one-component or two-component adhesives based on silicone or MS polymer, for example of the Stamcoll Safe type marketed by Serge Ferrari AG. However, any type of adhesive may be used, provided that the impermeability and waterproofing and breathability properties are not deleteriously affected. Advantageously, for surface coating applications, i.e. application of the back face of a textile to a layer of an insulation material or the like, the adhesive used is a re-activatable adhesive.

The present disclosure also concerns a process for the production of a coated textile as described above.

The web may be covered with a silicone based coating layer in accordance with any technique which is known to the person skilled in the art.

Advantageously, the coating step may be carried out in an aqueous base type liquid phase, in a more viscous LSR, RTV type phase, or more advantageously in the solvent phase. Carrying out the coating step in the solvent phase means that the viscosity can be controlled and the degree of penetration of the coating layer into the web can be controlled, while ensuring coating of the edges.

The textiles may be used as a covering for a wall of a building.

In practice, the back face is positioned facing the wall to be covered. The textile is attached to the wall by any means. As already mentioned, the back face may be primed with adhesive and fastened to the wall by this means.

A plurality of panels of textile may be assembled. Thus, it is possible to cover a building which is more than 11 m high in an impermeable manner using the coated textile and comply with future legislation.

BRIEF DESCRIPTION OF THE FIGURES

The manner of carrying out the disclosed embodiments as well as the advantages accruing to them will become apparent from the following description of embodiments made with the aid of the accompanying drawings, in which.

Figure 1:
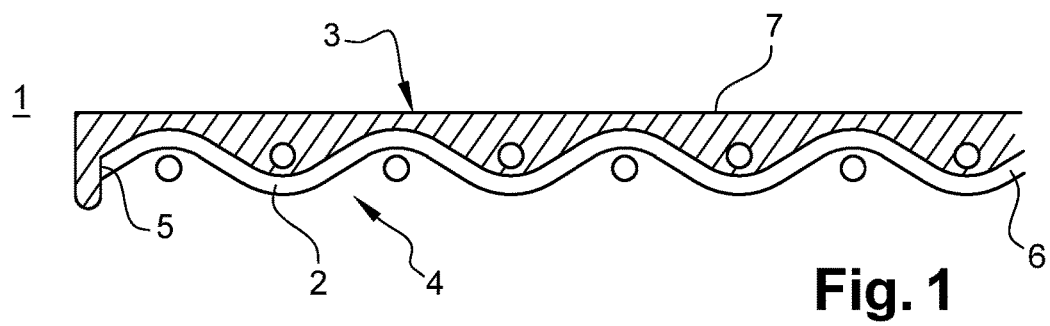
FIG. 1 is a cross section of one embodiment of a textile.
Figure 2:
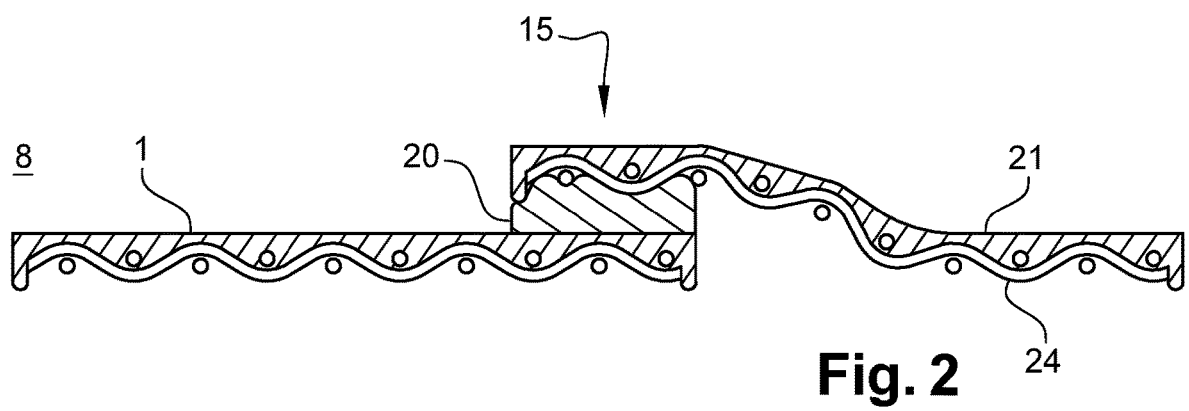
FIG. 2 is a cross section of two textiles of the figure assembled together.

Clearly, the dimensions and the proportions of the elements illustrated in FIGS. 1 and 2 have had to be exaggerated with respect to reality and have only been given with the aim of facilitating comprehension of the disclosed embodiments.

DETAILED DESCRIPTION

The embodiment of the coated textile 1 illustrated in FIG. 1 comprises a web 2 based on woven glass fibres. The web 2 has a front face 3, a back face 4 and edges 5, 6. The web 2 is covered with a coating layer 7 based on silicone at the level of the front face 3 and the edges 5, 6.

In this configuration, the thickness of the coating layer 7 is sufficient to ensure good protection of the coated textile 1 in the event of bad weather, such as heavy rain, at the edges 5 and 6 in particular, and is sufficient to guarantee strength and fire resistance while providing the coated textile 1 with a waterproof breathable nature.

The back face 4 of the web 2 is not coated, which means, as already indicated above, that any technique can be used with a view to attaching the coated textile 1 to a façade of a building.

FIG. 2 illustrates an assembly 8 of two panels in accordance with the embodiment illustrated in FIG. 1. In practice, a first textile 1 is positioned facing a second textile 21 in a manner such as to have an overlapping zone 15. The two panels 1 and 21 are then attached at this overlapping zone by interposing a line of adhesive 20 which comes into contact with the coating layer 7 of the first panel 1, and the back face 24 of the second power 21. Thus, the assembly 8 is impermeable, in particular at the level of the edge of the panel intended to be exposed to the exterior, or more generally to an atmosphere containing liquid moisture, and the physical properties of this assembly are substantially similar to those of the coated textiles 1 and 21.

Figure 3:
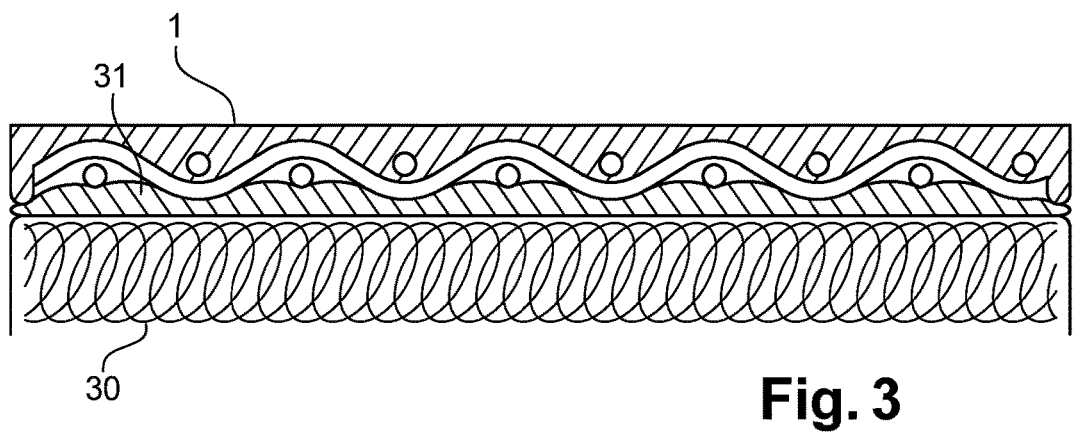
FIG. 3 is a cross sectional view of the textile of FIG. 1 associated with a support.

FIG. 3 illustrates the association of a textile sheet 1 with a support 30, which may be a layer of an insulating material such as rockwool or glass wool; via a layer 31 which is advantageously heat-reactivatable, present on all or a portion of the facing surfaces.

Figure 4:
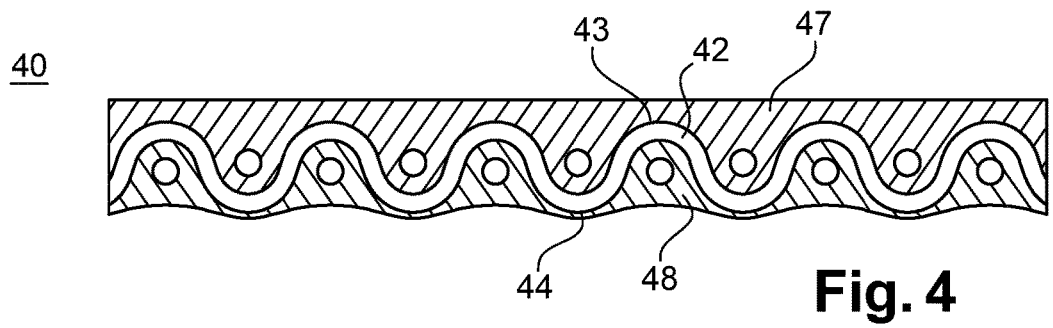
FIG. 4 is a cross section of another embodiment of a textile.

In a variation illustrated in FIG. 4, the textile 40 includes a woven core 42 which is equivalent to that of FIG. 1. The front face 43 of this core is covered with a first coating layer 47, and on its back face 44 is a second coating layer 48.

EXAMPLES

Coated textiles were produced from fabrics based on woven glass fibres and with different coating compositions. More precisely, the fabric was obtained with glass yarns which had been Z twisted at 40 twists/m; with a warp and weft density of 680 dtex. These yarns were woven in a proportion of 16 and 16.5 yarns per centimetre in the respective warp and weft directions, in accordance with a 4-harness satin weave.

The characteristics of the various textiles are summarized in Table 1.

TABLE 1

| Specimen number | Coating layer | Inorganic compound | Granule size of inorganic compound (D50) | Quantity of inorganic compound (% dry matter) |
|---|---|---|---|---|
| 1 (disclosed embodiment) | Silicone | Aluminium trihydrate | 2 μm | 45 |
| 2 (disclosed embodiment) | Silicone | Aluminium trihydrate | 16 μm | 55 |
| 3 (contrasting example) | Silicone | None | — | — |
| 4 (contrasting example) | Acrylate | Antimony trihydrate | 2 μm | 25 |

These coated textiles underwent a dynamic impermeability test before and after ageing, a static impermeability test, a breathability test, an adhesive breaking test, and a crease fold test. The GCV of each textile was also measured. The results are summarized in Table 2.

The dynamic permeability of water was measured in accordance with the standard EN 20811; a textile is sufficiently impermeable if the result of the water column test is more than 100 cm. The dynamic water column test can be used to quantify the impermeability of a product which is subjected to a gradual increase in pressure from a 60 cm column of water per min, denoted 60 cmWS/min. The test face was coated with the membrane and covered a surface area of 100 cm². The test had a target value which was defined by the user and the test was stopped as soon as it was reached. However, the test could have been stopped prematurely after three droplets became visible on the back of the membrane. The value in cm on the column corresponding to the third appearance was noted.

The specimens were subjected to ageing by placing them in an oven at 120° C. for one week. They were then tested in accordance with the above dynamic water column protocol.

In contrast to the measurement of the dynamic impermeability, wherein the pressure was varied by ramping it up, the measurement of the static impermeability (W1 test) employed a constant pressure procedure provided by a 20 mbar column of water. The test lasted two hours. The device was constituted by a reservoir of water, coloured to make it visible. The membrane was placed on top. A filter paper covered the top in order to provide evidence of the passage of water through the membrane and thus betray the non-permeability of the product. A plate of plexiglass was then deposited in order to prevent explosion phenomena due to the pressure. The result of the test is binary: either the product reaches the W1 classification, or it does not satisfy these conditions.

configuration. They were cut to a width of 5 cm and a length of 20 cm and were tested on a standardized tensile test bench. The breaking force of the adhesive was then measured in N/5 cm. The bond was considered to be satisfactory if breaking occurred above 200 N/5 cm.

The breaking strength after crease fold was measured in accordance with the standard ASTM D 4851. Glass textile membranes (5 cm width and 20 cm length) were pre-folded in accordance with specific conditions: the membrane was folded back on itself before being subjected to a pressure on its surface, repeated ten times by means of a roller, always in the same direction. The back face-to-the back face was tested as well as the front face-to-the front face.

The GCV was measured in accordance with the standard EN ISO 1716 with the "bomb calorimeter" method. The value for the GCV (gross calorific value) determines the role that the product could play in a fire. It is measured using a bomb calorimeter. A small amount of the material was placed in a crucible with a combustible agent. This was all placed in the bomb calorimeter filled with pure dioxygen. It was closed and placed in a thermostated bath the temperature of which was known and fixed. The bomb calorimeter was triggered; the principle of the measurement resides in the difference in temperature between the water of the bath before the reaction and after the reaction due to the energy of combustion. The final value for the GCV was provided in MJ/kg. As already mentioned, the desired GCV is a GCV of 3 MJ/kg or less.

TABLE 2

| Specimen | Dynamic impermeability (cm) EN 20811 | Dynamic impermeability after at ageing for 1 week Using EN 20811 | Static impermeability (W1 or not) EN 1928 | Sd (m) EN ISO 12572-C/ DIN 1931 | WVRT ((g/m²)/day) EN ISO 12572-C/ DIN 1931 | Adhesive breaking @200° C., 8 hours °(N/5 cm) Using EN 12311-1 | Breaking after crease fold (N/5 cm) ASTM D485.1 | GCV (MJ/kg) EN 1716 |
|---|---|---|---|---|---|---|---|---|
| 1 | >300 | >300 | W1 | 0.16 | 143 | >600 | >1000 | 2.75 |
| 2 | >300 | >300 | W1 | 0.18 | 126 | >600 | >1000 | 2.45 |
| 3 | >300 | >300 | W1 | 0.32 | 75 | >600 | >1000 | >4.5 |
| 4 | <60 | <10 | No W1 | 0.08 | 255 | 504-616 | 400 | 4.54 |

The breathability was measured in accordance with the standard EN ISO 12572-C/DIN 1931. The breathability was evaluated by comparison with a parameter for resistance to the diffusion of vapour (Sd), which corresponds to the diffusion-equivalent air layer thickness (in metres). This parameter was calculated from the transmission rate for water vapour (WVRT, for Water Vapour Rate of Transmission), expressed in g/m²/day, and depended on the thickness of the material. A textile was considered to be sufficiently breathable if the parameter Sd is less than 0.2 m.

It was evaluated by gravimetric measurement under moist conditions. The membrane was installed above a cup filled with a standardized quantity of water, then placed in a precisely controlled climatic chamber. The measurement was available after a few hours; the time varied as a function of the thickness of the product.

The adhesive breakage was measured in accordance with the standard EN 12311-1. The bonded assemblies were placed in an oven at 200° C. for 8 hours. It was a joint with a single covering of the adhesive device adapted to the application. The specimens were produced in a shear-tensile The various tests show that the membranes produced with a textile in accordance with the disclosed embodiments (specimens 1 and 2) have a GCV of less than 3 MJ/kg, while having impermeability, waterproofing and breathability and mechanical properties that mean that they can be used as a covering for a wall of a building, while the membranes produced with a textile with a coating layer not comprising the inorganic flame retardant compound (specimen 3) or based on acrylate (specimen 4) did not have the desired set of properties.

The invention claimed is:
1. A non-combustible coated textile, comprising:
   a web based on glass fibres having a back face, a front face, and at least one edge, said front face being covered with a covering layer based on silicone and said back face being capable of being bonded to a support, said coating layer having a thickness between 25 μm to 250 μm and comprising at least one inorganic flame retardant compound having a D50 granule size of less than 50 μm and in a quantity comprising between 5% to 70% by weight of the coating layer, which is sufficient for the coated textile to have a gross calorific value of less than or equal to 3 MJ/kg, and the coated textile having a breaking strength after crease fold exceeding 1000 N/5 cm, when measured in accordance with the standard ASTM D 4851 (2015).

2. The coated textile according to claim 1, wherein the quantity is between 15% and 65% by weight of the coating layer.

3. The coated textile according to claim 2, wherein the quantity is between 35% and 60% by weight of the coating layer.

4. The coated textile according to claim 1, wherein the D50 granule size is less than 20 µm.

5. The coated textile according to claim 1, wherein the thickness of the coating layer is between 50 and 100 µm.

6. The coated textile according to claim 1, wherein the web has a thickness between 20 µm and 1 mm.

7. The coated textile according to claim 1, wherein the web has a weight between 20 g/m² and 1000 g/m².

8. The coated textile according to claim 7, wherein the weight is between 50 g/m² and 500 g/m².

9. The coated textile according to claim 5, wherein the weight is between 100 g/m² and 300 g/m².

10. The coated textile according to claim 1, wherein the coating layer covers the edge of the web based on glass fibres.

11. The coated textile according to claim 1, wherein the back face of the web based on glass fibres is covered with a coating layer.

12. The coated textile according to claim 11, wherein the coating layers covering the front and back faces are based on the same material.

13. The coated textile according to claim 11, wherein the thickness of the coating layer covering the back face is less than the thickness of the coating layer covering the front face.

14. The coated textile according to claim 1, wherein the silicone is selected from the group comprising polydimethylsiloxanes, polydiphenylsiloxanes, oligosiloxanes, polyaminosiloxanes, polyvinylsiloxanes and their copolymers.

15. The coated textile according to claim 1, wherein said inorganic flame retardant compound is selected from the group comprising aluminium trihydrate, magnesium hydroxide, silicas, zeolites, zinc hydroxystannate, calcium hydroxystannate, antimony trioxide, calcium carbonate, inorganic pigments and metallic fillers.

16. A covering for a structure of a building, the covering comprising the coated textile according to claim 1.

17. A process for the production of the coated textile according to claim 1, comprising at least the following steps:
   obtaining the web based on glass fibers,
   coating said front face with a silicone-based composition forming the coating layer based on silicone.

18. The process according to claim 17, wherein the coating step is carried out in the aqueous base type liquid phase or in a more viscous LSR, RTV type phase.

19. The process according to claim 17, wherein the web is a woven or nonwoven web.

* * * * *